(12) United States Patent
Ishida et al.

(10) Patent No.: US 10,795,851 B2
(45) Date of Patent: Oct. 6, 2020

(54) RELAY DEVICE AND INFORMATION PROCESSING SYSTEM

(71) Applicant: FUJITSU CLIENT COMPUTING LIMITED, Kanagawa (JP)

(72) Inventors: Tomohiro Ishida, Kawasaki (JP); Masatoshi Kimura, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/529,269

(22) Filed: Aug. 1, 2019

(65) Prior Publication Data

US 2019/0354504 A1  Nov. 21, 2019

Related U.S. Application Data

(63) Continuation of application No. PCT/JP2019/016716, filed on Apr. 18, 2019.

(30) Foreign Application Priority Data

Apr. 18, 2018 (JP) ................................. 2018-079597
Mar. 4, 2019 (JP) ................................. 2019-038927

(51) Int. Cl.
*G06F 13/42* (2006.01)
*G06F 13/16* (2006.01)

(52) U.S. Cl.
CPC ...... *G06F 13/4282* (2013.01); *G06F 13/1668* (2013.01); *G06F 2213/0026* (2013.01)

(58) Field of Classification Search
CPC ............ G06F 13/4282; G06F 13/1668; G06F 2213/0026
See application file for complete search history.

(56) References Cited

U.S. PATENT DOCUMENTS

| 9,460,039 | B2 * | 10/2016 | Davis ...................... H04L 49/35 |
| 9,720,864 | B2 * | 8/2017 | Kim ..................... G06F 13/4022 |
| 2010/0088453 | A1 * | 4/2010 | Solki ..................... G09G 5/363 710/313 |
| 2010/0180062 | A1 * | 7/2010 | Hidaka ............... G06F 13/4022 710/314 |

(Continued)

FOREIGN PATENT DOCUMENTS

| JP | 2005-301714 A | 10/2005 |
| JP | 2008-041027 A | 2/2008 |

(Continued)

OTHER PUBLICATIONS

Notification of Reasons for Refusal issued in Japanese Patent Application No. 2019-038927, dated Apr. 23, 2019 (5 pages).

(Continued)

*Primary Examiner* — Henry Tsai
*Assistant Examiner* — Christopher A Daley
(74) *Attorney, Agent, or Firm* — Osha Liang LLP

(57) ABSTRACT

A first end point and a second end point are provided. The first end point receives data from a root complex of a first platform among platforms, each serving as a computer that executes arithmetic processing. The second end point transfers the data to a root complex of a second platform among the platforms, the data to be transferred being received at the second end point by tunneling from the first end point.

1 Claim, 11 Drawing Sheets

(56) References Cited

U.S. PATENT DOCUMENTS

| | | |
|---|---|---|
| 2013/0147815 A1 | 6/2013 | Solki et al. |
| 2014/0372637 A1* | 12/2014 | Voorhees ............ G06F 13/4295 710/52 |
| 2015/0261709 A1* | 9/2015 | Billi .................... G06F 13/0422 710/316 |
| 2016/0188511 A1 | 6/2016 | Muraoka et al. |
| 2016/0283433 A1* | 9/2016 | Nair .................... G06F 13/4068 |
| 2017/0235700 A1 | 8/2017 | Solki et al. |
| 2018/0052793 A1* | 2/2018 | Fang ................... H04L 41/0806 |
| 2018/0314670 A1 | 11/2018 | Solki et al. |

FOREIGN PATENT DOCUMENTS

| | | |
|---|---|---|
| JP | 2009-110032 A | 5/2009 |
| JP | 2012-504835 A | 2/2012 |
| WO | 2008018485 A1 | 2/2008 |
| WO | 2015162777 A1 | 10/2015 |

OTHER PUBLICATIONS

International Search Report issued in International Application No. PCT/JP2019/016716, dated Apr. 6, 2019 (3 pages).

* cited by examiner

RELAY DEVICE AND INFORMATION PROCESSING SYSTEM

CROSS-REFERENCE TO RELATED APPLICATIONS

This application is national stage application of International Application No. PCT/JP2019/016716, filed Apr. 18, 2019, which designates the United States, incorporated herein by reference, and which claims the benefit of priority from Japanese Patent Application No. 2018-079597, filed Apr. 18, 2018, and Japanese Patent Application No. 2019-038927, filed Mar. 4, 2019, the entire contents of which are incorporated herein by reference.

TECHNICAL FIELD

The present disclosure relates to a relay device and an information processing system.

BACKGROUND

There is known a method of performing parallel computation using plural calculators (arithmetic devices). In this method, data is exchanged between the calculators over an Ethernet (registered trademark) line, for example. However, a communication speed of the Ethernet line may become a bottleneck.

SUMMARY

The relay device according to the aspect is connected to platforms, each serving as a computer that performs arithmetic processing, to communicate with each of the platforms and to relay communication between the platforms over a Peripheral Component Interconnect Express (PCIe) bus. The relay device includes: a first end point that receives data from a root complex of a first platform among the platforms; and a second end point that transfers the data to a root complex of a second platform among the platforms, the data to be transferred being received at the second end point by tunneling from the first end point.

According to the above aspect of the present disclosure, it is capable of achieving high-speed communication between platforms.

DETAILED DESCRIPTION

Exemplary embodiments of a relay device and an information processing system will be described with reference to the drawings. Note that the embodiment described below is merely an example, and does not intend to exclude various modifications and technical applications that are not clearly described in the embodiment. That is, the present embodiment can be variously modified to be implemented without departing from the gist of the invention. Each of the drawings does not necessarily include only components illustrated therein, and may include another function and the like.

(A) Communication Using PCIe Bus

In order to perform an arithmetic operation with a high load such as, for example, AI inference processing and image processing based on a PC, it can be considered to use a processor (arithmetic operation processor) such as a GPU or an FPGA, which can be used as a device of a PC. The PC is an abbreviation of a personal computer, and the AI is an abbreviation of artificial intelligence. The GPU is an abbreviation of a graphics processing unit, and the FPGA is an abbreviation of a field programmable gate array.

In order to cause the processor described above to operate as a device of a PC, it is required to install a device driver for operating specific hardware on an operation system (OS). Examples of the OS include Windows (registered trademark) and Linux (registered trademark). It is also required to create the device driver conforming to requirements of each OS. Especially, in the case of Windows, a driver requirement and the like are different depending on a version of the OS, and development know-how for device drivers has been demanded. Thus, without the development know-how for a Windows-compatible device driver, no matter how performance of the processor is high, it may be impossible to use the processor as a device of the PC.

As an interface for connecting a device to the PC, there is known a PCIe interface that is able to transfer large-volume data at high speed. On the PCIe, a processor, such as an Intel (registered trademark) processor, serves as a root complex (RC) operating as a host, while the device serves as an end point (EP). Data transfer is performed between the host and the device.

Figure 1:
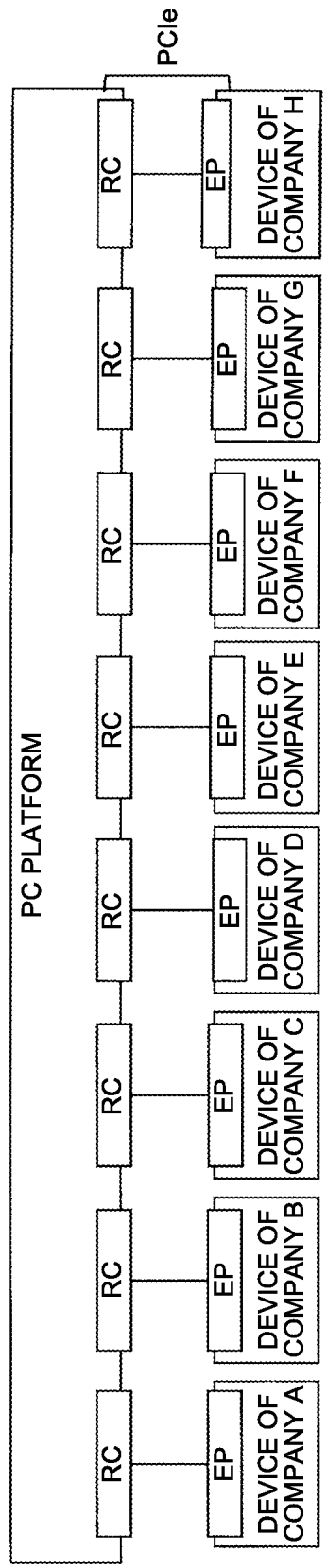
FIG. 1 is a diagram exemplifying a connection configuration using a PCIe bus in various platforms.
Figure 2:
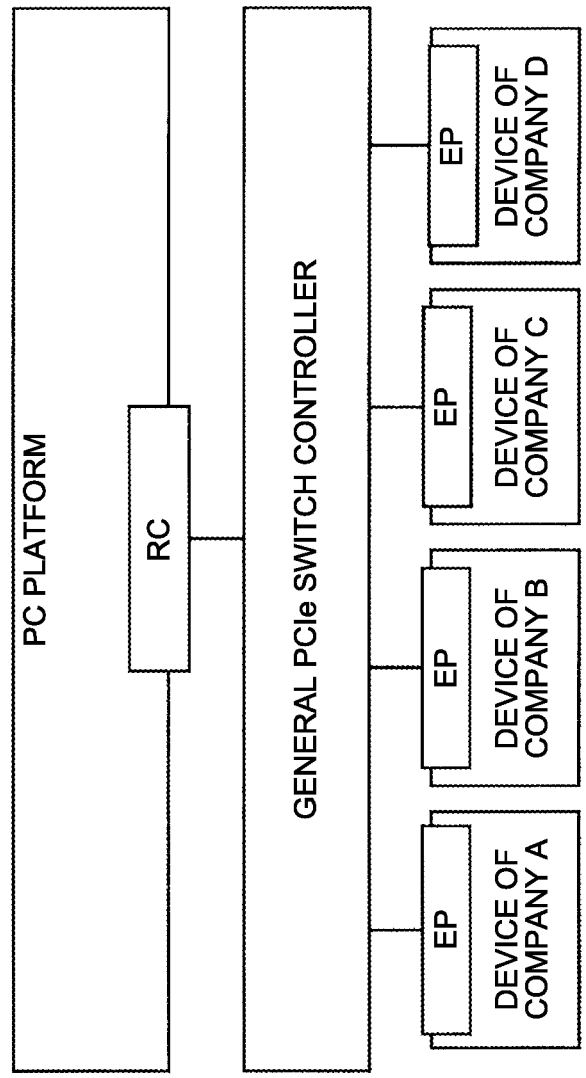
FIG. 2 is a diagram exemplifying a connection configuration using the PCIe bus in various platforms.
Figure 3:
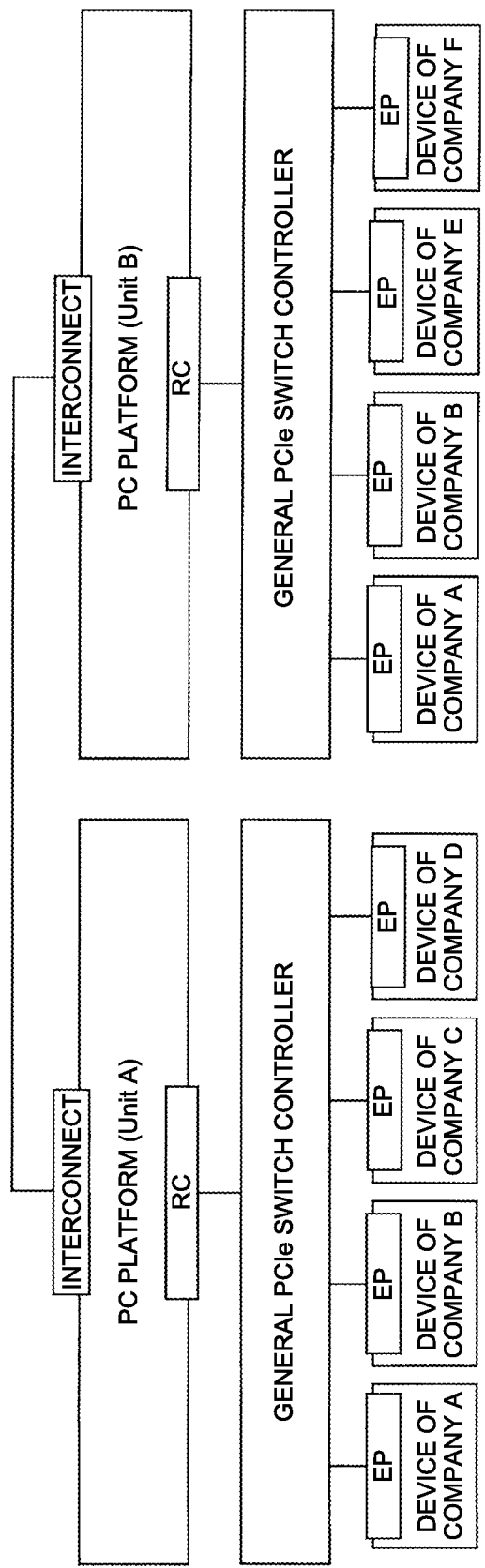
FIG. 3 is a diagram exemplifying a connection configuration using the PCIe bus in various platforms.

Each of FIGS. 1 to 3 is a diagram exemplifying a connection configuration using a PCIe bus in various platforms.

For example, an x86-compatible processor manufactured by Intel Corporation is mounted on a PC platform, and a general-purpose OS such as Windows and Linux operates thereon.

FIG. 1 represents an example of a configuration in which the RC is connected to the EP one-to-one on the PC platform which is provided with the PCIe. In this method exemplified in FIG. 1, the PC platform serves as the RC, while each device serving as the EP is connected to the PC platform. Controllers used for respective devices in FIG. 1 are provided by different manufacturers (Company A to Company H).

Each device becomes available when a device driver for each device is installed on the OS of the PC platform, so that each device cannot be independently operated. When an operation failure occurs on the PC platform, all the devices stop operation.

A device driver is required to be developed to be compatible with each kind of hardware and each OS, so that the driver should be appropriately developed when the OS is changed.

FIG. 2 represents an example of a configuration in which plural EPs are connected to a single RC via a PCIe switch controller. Also in this method exemplified in FIG. 2, the PC platform serves as the RC, while each device serving as the EP is connected to the PC platform.

The PCIe switch controller exemplified in FIG. 2 is used in a case where the number of RCs is insufficient compared with the number of devices to be connected when connecting plural EPs to a single RC. With this method, a band for one RC is shared by four EPs, so that performance is deteriorated.

However, the method of driving the device is the same as that in the above-described case of connecting the RC to the EP one-to-one, so that the device cannot be operated alone. The device becomes available when the device driver for each device is installed on the OS of the Intel x86 platform.

FIG. 3 represents an example of a configuration in which two PC platforms (Unit A and Unit B) are interconnected via an interconnect.

Also in this method exemplified in FIG. 3, the PC platform serves as the RC, while each device serving as the EP is connected to the PC platform.

Each device becomes available when the device driver for each device is installed on the OS of the PC platform.

As exemplified in FIG. 3, by connecting the platforms (processors) on which the OS operates via the interconnect, Ethernet, or the like, the processors can be synchronously driven.

However, the same OS is required to be operated on the platforms to be connected, and the platforms to be connected are required to support the same connection method. Therefore, the configuration exemplified in FIG. 3 is not suitable for connecting different platforms.

For example, when the Unit A in FIG. 3 causes a device of Company E connected to the Unit B to perform processing, the processing is passed from the processor of the Unit A to the processor of the Unit B via the interconnect, and thereby the processor of the Unit B causes the device of Company E to perform the processing.

Between the platforms connected via the interconnect, each processor is able to give processing to a device connected to another unit. However, the processing is necessarily performed via a processor connected to the device, so that a load on a processor on a reception side is accordingly increased.

As described above with reference to FIGS. 1 to 3, when PCIe communication in the related art is directly applied to communication between plural platforms, the device driver for each device is indispensable to the OS, so that development cost and maintenance cost thereof may be required.

An information processing system according to the present disclosure achieves communication between the platforms by connecting plural platforms to each other via the PCIe bus, and provides a configuration in which each processor does not require a driver to serve as the RC for another processor.

(B) Configuration

Figure 4:
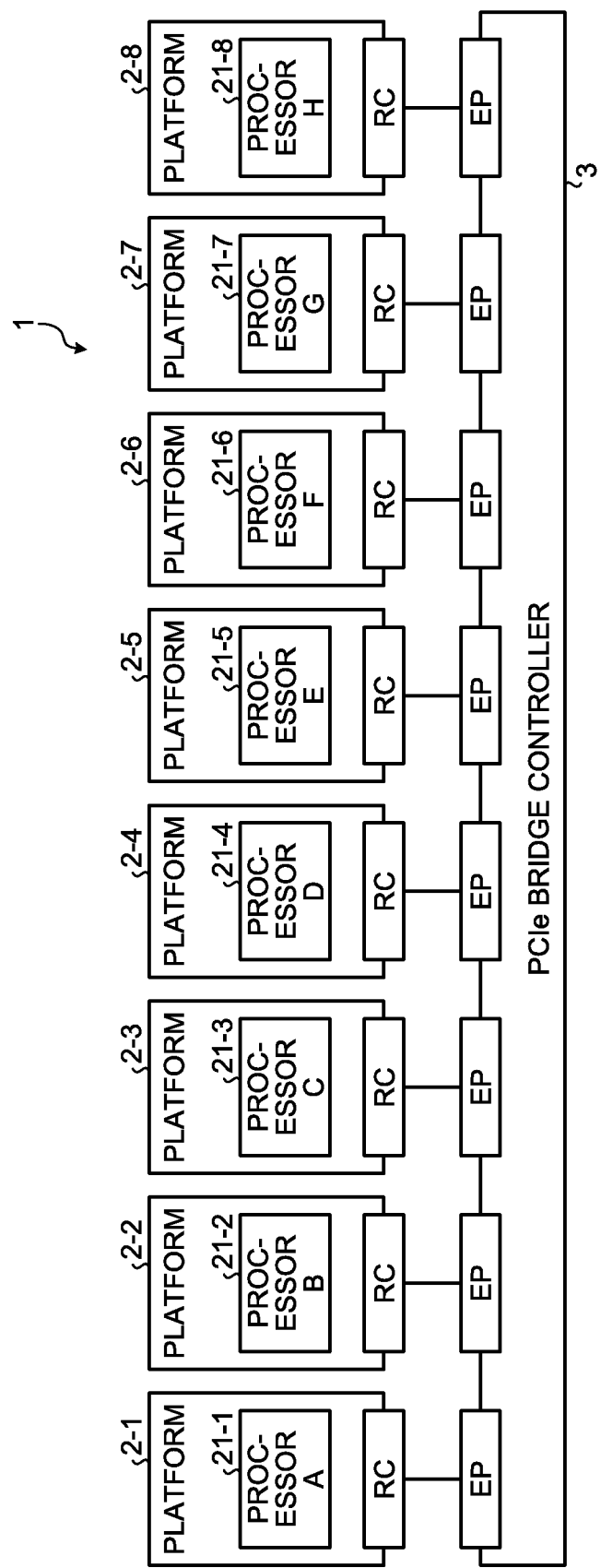
FIG. 4 is a diagram schematically illustrating a connection configuration of a plurality of platforms in an information processing system as an example of an embodiment.

FIG. 4 is a diagram schematically illustrating a connection configuration of a plurality of platforms in an information processing system 1 as an example of the embodiment.

The information processing system 1 exemplified in FIG. 4 includes a PCIe bridge controller 3 and plural (eight in the example illustrated in FIG. 4) platforms 2-1 to 2-8. Each of the platforms 2-1 to 2-8 is connected to the PCIe bridge controller 3.

In the following description, as a reference numeral indicating the platform, the reference numerals 2-1 to 2-8 are used in a case in which one of the platforms is required to be specified, and the reference numeral 2 is used in a case of indicating a certain platform. The platform 2 may also be referred to as a PC platform 2.

Platform

The platform 2-1 includes a processor 21-1. Similarly, the platforms 2-2 to 2-8 include processors 21-2 to 21-8, respectively.

The respective processors 21-1 to 21-8 may be provided by different manufacturers (vendors). For example, it is assumed that the processors 21-1, 21-2, 21-3, 21-4, 21-5, 21-6, 21-7, and 21-8 are provided by Company A, Company B, Company C, Company D, Company E, Company F, Company G, and Company H, respectively.

In the following description, the processors 21-1, 21-2, 21-3, 21-4, 21-5, 21-6, 21-7, and 21-8 may be referred to as processors A, B, C, D, E, F, G, and H, respectively. To the respective EPs mounted on the PCIe bridge controller 3, different platforms may be connected. Additionally, two or more EPs may be connected to one platform, and the platform may use a plurality of RCs to communicate with the PCIe bridge controller 3.

In the following description, as the reference numeral indicating the processor, the reference numerals 21-1 to 21-8, the reference signs A to H, or the like are used in a case in which one of the processors is required to be specified, and the reference numeral 21 is used in a case of indicating a certain processor.

Figure 10:
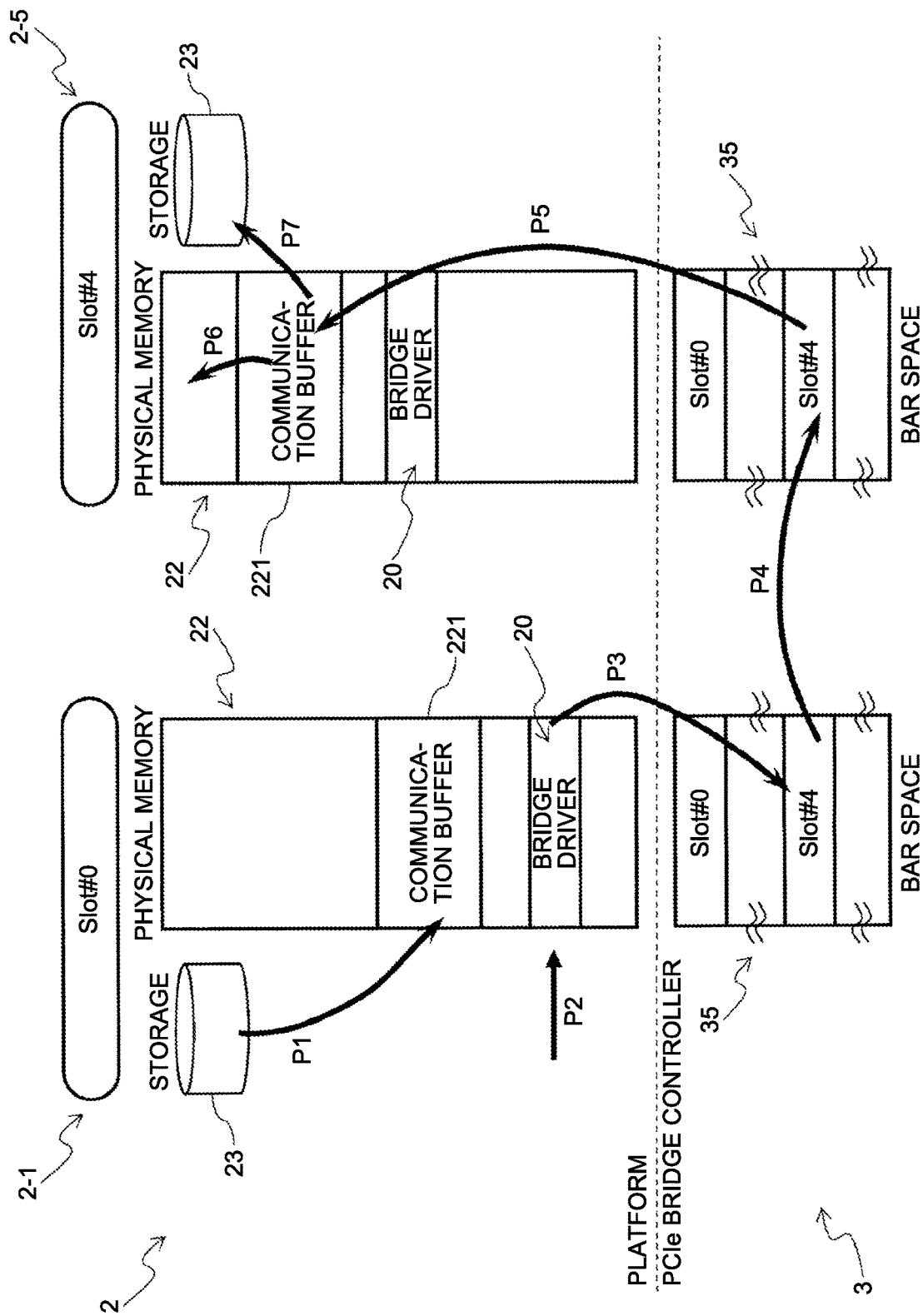
FIG. 10 is a diagram for explaining a data transfer method between platforms via the PCIe bridge controller in the information processing system as an example of the embodiment.

Each of the platforms 2-1 to 2-8 provides an computer environment for performing arithmetic processing such as AI inference processing and image processing, and includes the processor 21, and a storage 23 and a memory (physical memory) 22 illustrated in FIG. 10.

On the platform 2, various functions are implemented when the processor 21 executes a program stored in the memory 22 or the storage 23.

The storage 23 is a storage device such as a hard disk drive (HDD), a solid state drive (SSD), and a storage class memory (SCM), and stores therein various kinds of data.

The memory 22 is a storage memory including a read only memory (ROM) and a random access memory (RAM). In the ROM of the memory 22, various software programs and data for this program and the like are written. The software program on the memory 22 is appropriately read by the processor 21 to be executed. The RAM of the memory 22 is used as a primary storage memory or a working memory.

The processor 21 controls the entire platform 2. The processor 21 may be a multiprocessor. For example, the processor 21 may be any one of a central processing unit (CPU), a micro processing unit (MPU), a digital signal processor (DSP), an application specific integrated circuit (ASIC), a programmable logic device (PLD), and a field programmable gate array (FPGA). The processor 21 may be a combination of two or more types of components among the CPU, the MPU, the DSP, the ASIC, the PLD, and the FPGA.

Figure 5:
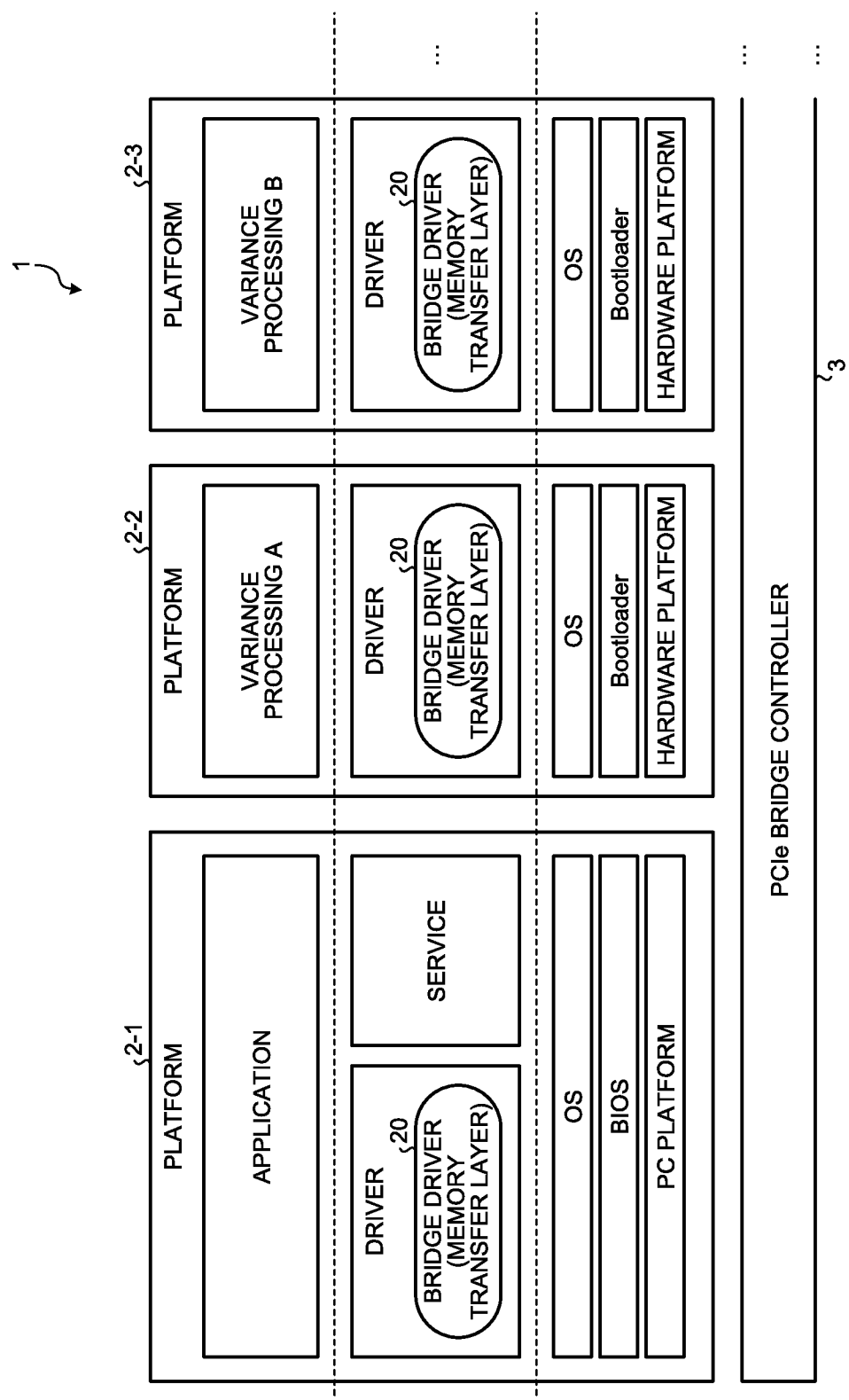
FIG. 5 is a diagram exemplifying a software configuration of a platform in the information processing system as an example of the embodiment.

FIG. 5 is a diagram exemplifying a software configuration of the platform 2 in the information processing system 1 as an example of the embodiment.

For convenience, FIG. 5 illustrates only software configurations of the platforms 2-1 to 2-3.

In the information processing system 1 exemplified in FIG. 5, the OS of the platform 2-1 is Windows, and a store management program is executed on this OS. The OS of each of the platforms 2-2 and 2-3 is Linux, and a variance processing program (variance processing A, B) is executed on this OS.

Each platform 2 includes a bridge driver 20. The platform 2 communicates with the PCIe bridge controller 3 and another platform 2 via the bridge driver 20. A communication method performed by the bridge driver 20 will be described later.

Each platform 2 includes the processor 21 and the memory (physical memory) 22. The processor 21 executes the OS, various programs, a driver, and the like stored in the memory 22 to implement respective functions.

The processors 21 included in the respective platforms 2 may be provided by vendors different from each other. In the example illustrated in FIG. 4, a platform including a plurality of RCs (for example, the x86 processor manufactured by Intel Corporation) may be used as at least some of the platforms 2 (for example, the platform 2-7).

Each of the platforms 2 is configured to be able to independently operate without influencing other driver configurations.

On the platform 2, as described later with reference to FIG. 10, part of a storage area of the memory 22 is used as a communication buffer 221 in which data transferred between the platforms 2 (between the processors 21) is temporarily stored.

The PCIe bridge controller 3 achieves communication of data and the like among the platforms 2-1 to 2-7.

Figure 6:
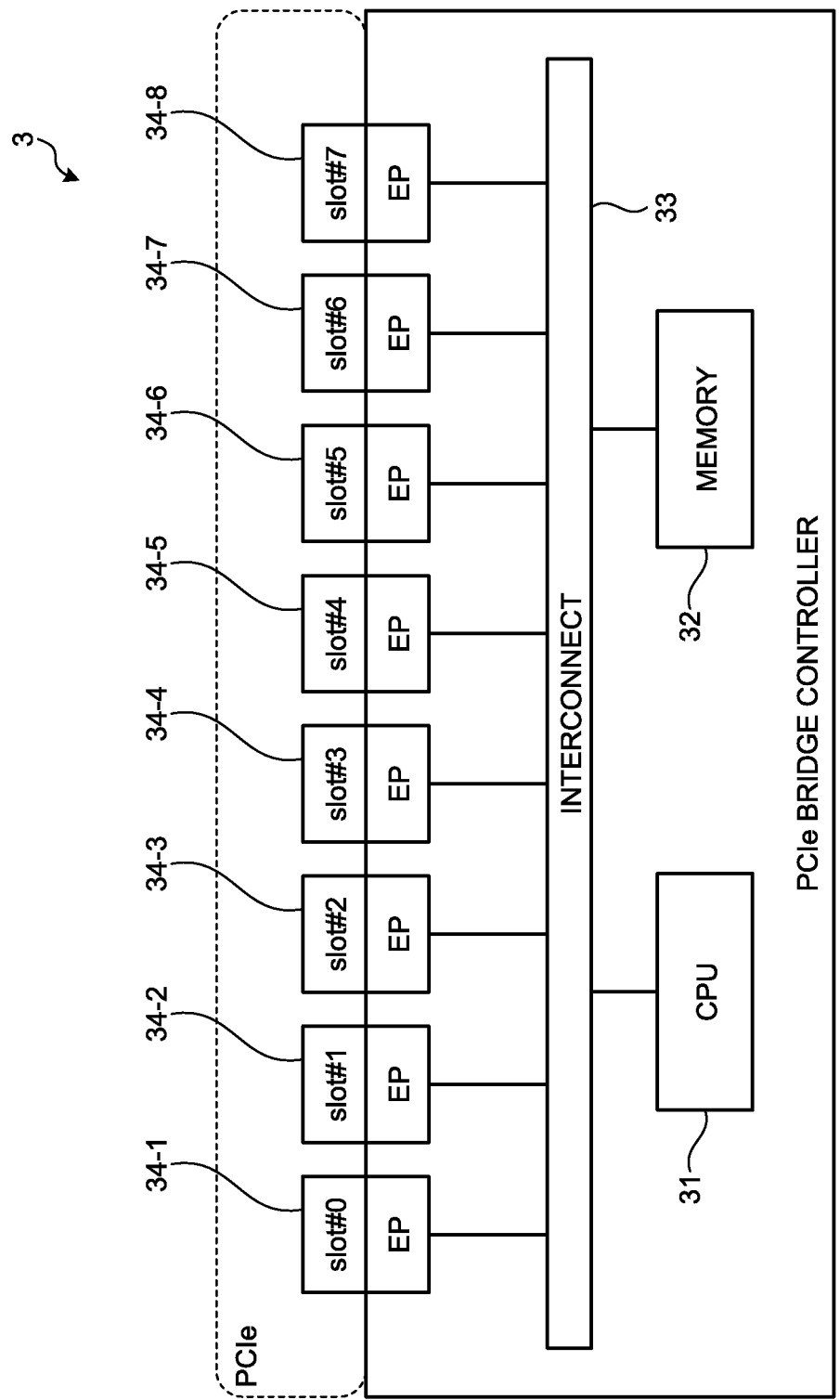
FIG. 6 is a diagram schematically illustrating a hardware configuration of a PCIe bridge controller in the information processing system as an example of the embodiment.

FIG. 6 is a diagram schematically illustrating a hardware configuration of the PCIe bridge controller 3 in the information processing system 1 as an example of the embodiment.

The PCIe bridge controller 3 is, for example, a relay device including eight channels of EPs in a single chip. As illustrated in FIG. 6, the PCIe bridge controller 3 includes a CPU 31, a memory 32, an interconnect 33, and a plurality of (eight in the example illustrated in FIG. 6) slots 34-1 to 34-8.

A device that is configured to meet the PCIe standard is connected to each of the slots 34-1 to 34-8. Specifically, in the information processing system 1, the platform 2 is connected to each of the slots 34-1 to 34-8.

In the following description, as a reference numeral indicating the slot, the reference numerals 34-1 to 34-8 are used in a case in which one of the slots is required to be specified, and the reference numeral 34 is used in a case of indicating a certain slot.

A single processor 21 may be connected to a single slot 34. Alternatively, a single platform 2 may be connected to two or more slots 34. The embodiment can be variously modified to be implemented.

By assigning two or more slots 34 to a single platform 2, it may be possible for this platform 2 to perform communication using a wide communication band.

Each of the slots 34 is connected to the interconnect 33 via an internal bus. Also the CPU 31 and the memory 32 are connected to the interconnect 33. Accordingly, each of the slots 34, the CPU 31, and the memory 32 are connected so that they can communicate with each other via the interconnect 33.

The memory 32 is, for example, a storage memory (physical memory) including a ROM and a RAM. In the ROM of the memory 32, a software program related to data communication control and data for this program and the like are written. The software program on the memory 32 is appropriately read by the CPU 31 to be executed. The RAM of the memory 32 is used as a primary storage memory or a working memory.

The PCIe bridge controller 3 includes registers 35 (refer to FIG. 10) that are associated with the respective slots. A storage area for each slot is provided within a Base Address Register (BAR) space of the register 35. In the BAR space of the register 35, the storage areas corresponding to each of slots #0 to #7 are provided. As described later, the PCIe bridge controller 3 performs data transfer between the platforms 2 by using the storage area for each slot in the BAR space.

The CPU 31 is controls the entire PCIe bridge controller 3. The CPU 31 may be a multiprocessor. In place of the CPU 31, any one of the MPU, the DSP, the ASIC, the PLD, and the FPGA may be used. The CPU 31 may be a combination of two or more types of components among the CPU, the MPU, the DSP, the ASIC, the PLD, and the FPGA.

When the CPU 31 executes the software program stored in the memory 32, data transfer between the platforms 2 (between the processors 21) is achieved by the PCIe bridge controller 3.

The PCIe bridge controller 3 uses PCIe to increase speed of data transfer between the platforms 2. The PCIe bridge controller 3 causes the processor included in each of the platforms 2 to operate as the RC as illustrated in FIG. 4, and achieves data transfer between the EPs operating as devices.

Specifically, in the information processing system 1, the processor of each platform 2 is caused to operate as the RC of PCIe as a data transfer interface. The PCIe bridge controller 3, that is, the slot 34 to which each platform 2 is connected, is caused to operate as the EP with respect to each platform 2 (processor 21).

As a method of connecting the PCIe bridge controller 3 to the processor 21 as the EP, known various methods can be used.

For example, at the time of connection with the platform 2, the PCIe bridge controller 3 notifies the processor 21 of a signal indicating to function as the EP, thereby being connected to the processor 21 as the EP.

The PCIe bridge controller 3 tunnels data by an End Point to End Point (EP-to-EP) communication to transfer the data to a plurality of RCs. Communication between the platforms is logically connected at the time when a PCIe transaction arises, and when data transfer does not concentrate on one processor, data transfer can be performed in parallel between the respective platforms.

Figure 7:
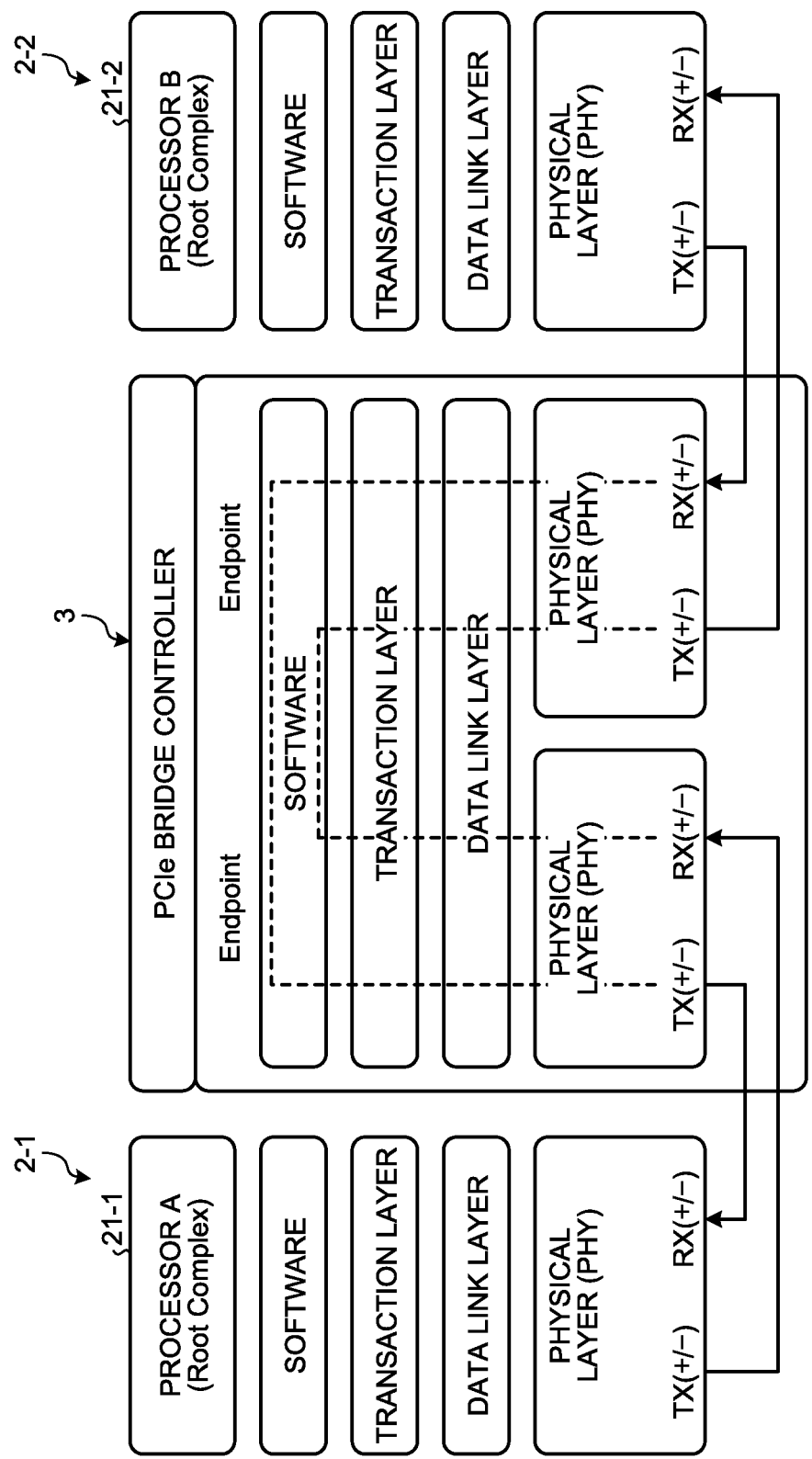
FIG. 7 is a diagram illustrating a layer configuration of PCIe as an example of the embodiment.

FIG. 7 is a diagram illustrating a layer configuration of PCIe as an example of the embodiment.

FIG. 7 illustrates an example in which communication is performed between the processor A of the platform 2-1 and the processor B of the platform 2-2.

On the platform 2-1 as a transmission source, data generated by the processor A serving as the RC is transferred through software, a transaction layer, a data link layer, and a physical layer (PHY) successively, and is transferred to a physical layer of the PCIe bridge controller 3 from the physical layer of the platform 2-1.

In the PCIe bridge controller 3, the data is transferred through the physical layer, a data link layer, a transaction layer, and software successively, and transferred to the EP corresponding to the RC of the platform 2 as a transmission destination by tunneling.

That is, in the PCIe bridge controller 3, the data is transferred from an RC included in a platform to another RC included in another platform by performing tunneling of the data between the EPs (namely, performing tunneling of the data received from a platform by an EP to another EP).

On the platform 2-2 as a transmission destination, the data transferred from the PCIe bridge controller 3 is transferred through a physical layer (PHY), a data link layer, a transaction layer, and software successively, and transferred to the processor B of the platform 2-2 as a transmission destination.

In the present information processing system 1, communication between the processors 21 (between the platforms 2) is logically connected at the time when a PCIe transaction arises.

When data transfer from a plurality of other processors 21 does not concentrate on a specific processor 21 connected to one of the eight slots included in the PCIe bridge controller 3, data transfer may be performed in parallel between the processors 21 in a plurality of different groups.

For example, in a case in which each of the processor B of the platform 2-2 and the processor C of the platform 2-3 attempts to communicate with the processor A of the platform 2-1, the PCIe bridge controller 3 serially processes communication of the processors B and C.

However, when communication is performed between different processors and communication does not concentrate on a specific processor, such as communications between processor A and processor B, processor C and processor D, and processor E and processor F, the PCIe bridge controller 3 processes the communication between the respective processors 21 in parallel.

Figure 8:
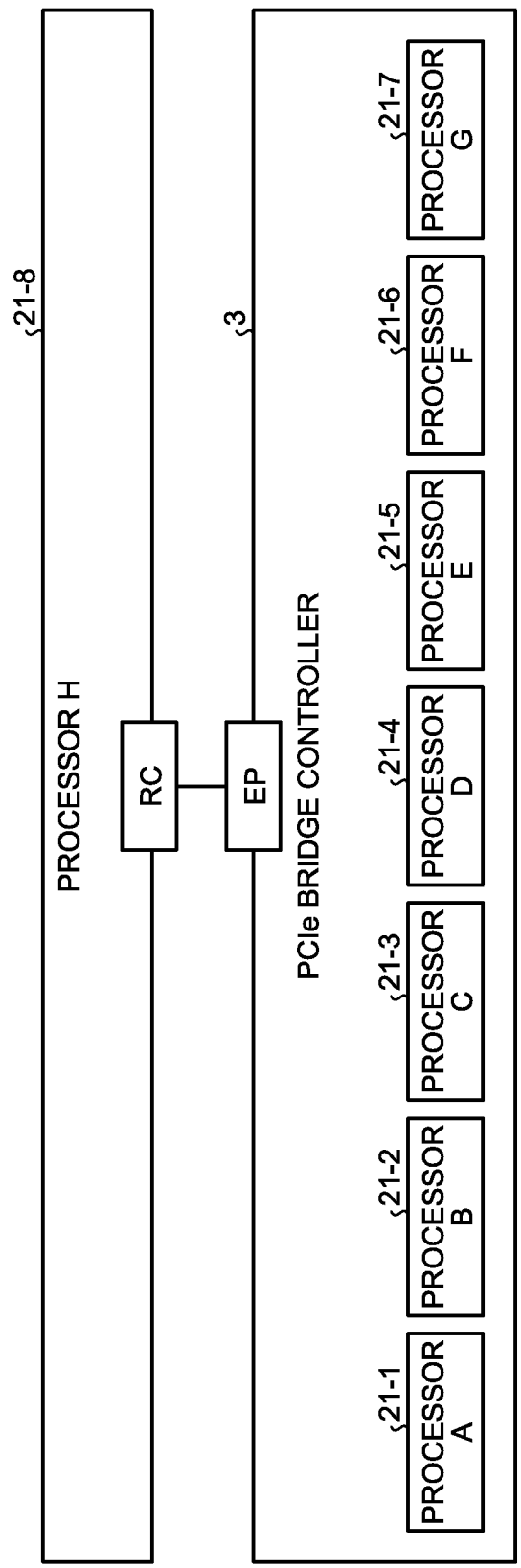
FIG. 8 is a diagram exemplifying a view from a processor toward the other processors in the information processing system as an example of the embodiment.
Figure 9:
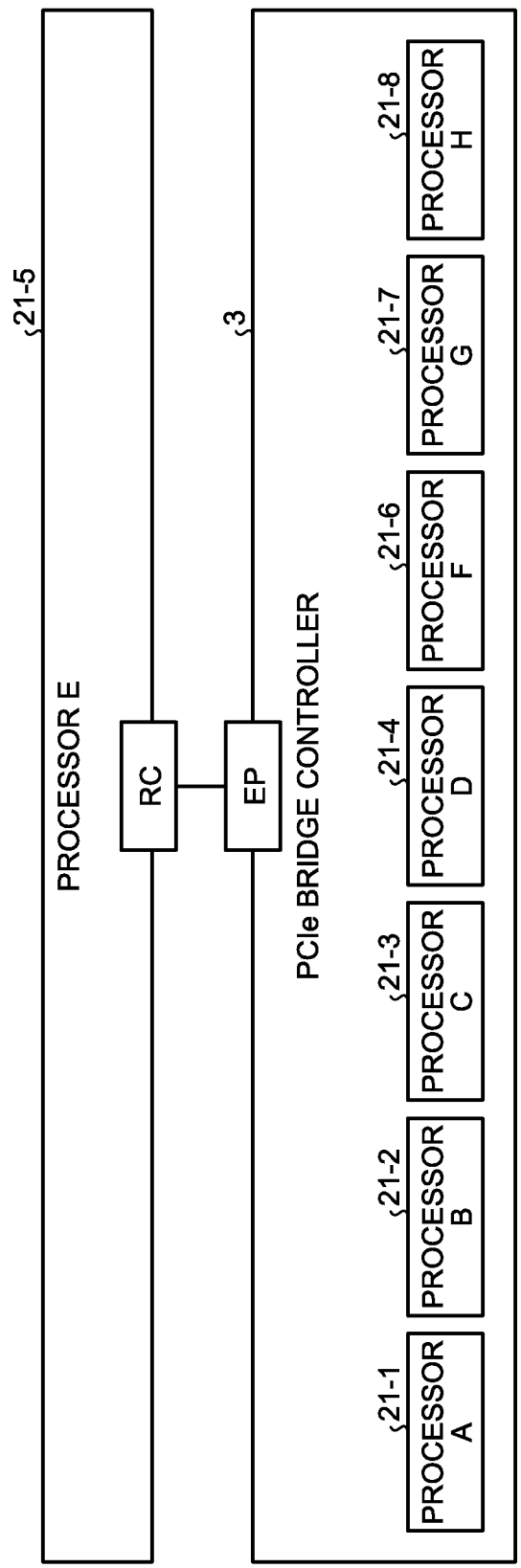
FIG. 9 is a diagram exemplifying a view from a processor toward the other processors in the information processing system as an example of the embodiment.

FIG. 8 is a diagram exemplifying a view from a processor 21-8 (processor H) toward the other processors 21 in the information processing system 1 as an example of the embodiment. FIG. 9 is a diagram exemplifying a view from a processor 21-5 (processor E) toward the other processors 21.

Even when communications are performed between the processors 21, only the PCIe bridge controller 3 can be viewed from the OS (for example, a device manager of Windows) on each processor 21. Therefore, it is not required to directly manage another processor 21 being a connection destination. Accordingly, the processor 21 connected to the PCIe bridge controller 3 can be managed by a device driver provided in the PCIe bridge controller 3.

Thus, it is not required to prepare device drivers for operating the respective processors 21 serving as a transmission source and a reception destination. Communication between the processors 21 can be performed by simply carrying out communication processing on the PCIe bridge controller 3 by using a driver of the PCIe bridge controller 3.

(C) Operation

The following describes a data transfer method between the processors 21 via the PCIe bridge controller 3 in the information processing system 1 as an example of the embodiment configured as described above with reference to FIG. 10.

In the example illustrated in FIG. 10, data from the platform 2-1 connected to the slot #0 is transferred to the platform 2-5 connected to the slot #4.

On the platform 2-1 as a data transmission source, data transmitted by software and the like (hereinafter, referred to as transmission data) is loaded into the communication buffer 221 from the storage 23 included in the platform 2-1 (the reference sign P1 in FIG. 10).

Position information (for example, Offset/Length) of an area in which the transmission data is stored in the communication buffer 221 and information of the transmission destination (for example, Slot/Offset) are designated by the software, and those pieces of information are passed to the bridge driver 20 (the reference sign P2).

The bridge driver 20 in the transmission source EP passes transfer data to an address of the slot #4 in the BAR space (the reference sign P3). In the PCIe bridge controller 3, the transfer data is transmitted through a transmission source port to a slot (transmission destination slot) corresponding to the transmission destination platform 2-5 by the EP-to-EP communication (the reference sign P4). At the transmission destination slot, the transfer data is stored on a storage area corresponding to the slot #4 in the BAR space of the register 35.

In the transmission destination slot corresponding to the platform 2-5, the bridge driver 20 transfers the transfer data from the storage area corresponding to the slot #4 in the BAR space of the register 35 to the communication buffer 221, and the transfer data is stored on a predetermined area which is specified by offset in the communication buffer 221 (the reference sign P5).

On the transmission destination platform 2-5, in accordance with the program, the transfer data stored in the communication buffer 221 is read out, and is moved to the memory (local memory) 22 or the storage 23 (the reference signs P6 and P7).

As described above, the data (transfer data) is transferred from the platform 2-1 as a transfer source to the platform 2-5 as a transfer destination.

Figure 11:
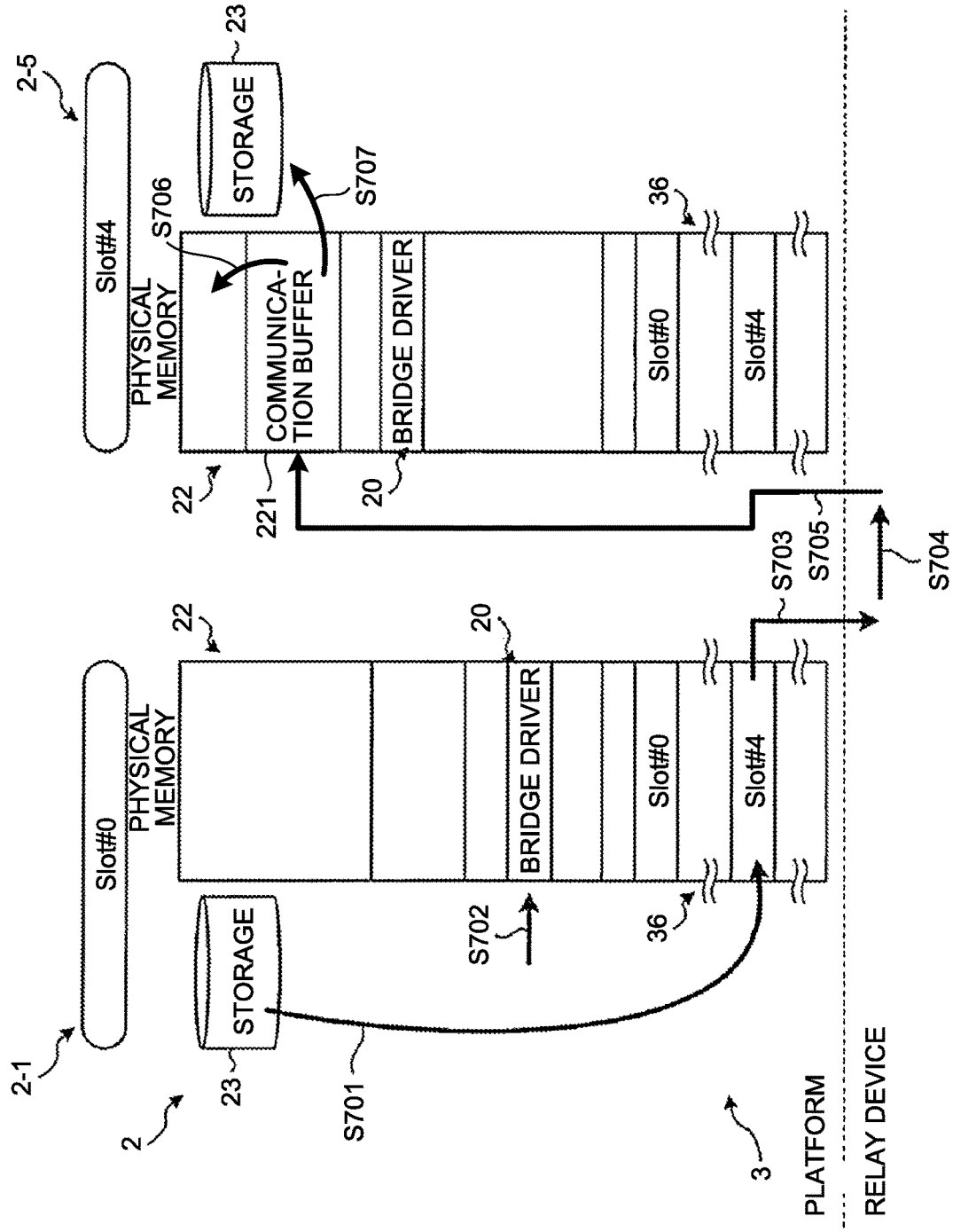
FIG. 11 is a diagram for explaining a data transfer method between platforms via the PCIe bridge controller in the information processing system as an example of the embodiment.

The following describes a data transfer method between the platforms 2 via the PCIe bridge controller 3 in the information processing system 1 with reference to FIG. 11. FIG. 11 is a diagram for explaining an example of the data transfer method between the platforms via the PCIe bridge controller 3 in the information processing system 1 according to the present embodiment.

In the example illustrated in FIG. 11, described is a case of transferring the data from the platform 2-1 connected to the slot #0 to the platform 2-5 connected to the slot #4.

The platform 2-1 as a transmission source stores the data transmitted by software and the like (hereinafter, referred to as transmission data) in a memory area 36 of the platform 2-1 from the storage 23 and the like included in the platform 2-1 (Step S701).

The memory area 36 may be part of the communication buffer in which data to be transferred is temporarily stored. The memory area 36 is an area that is provided in the memory 22 of each of the platforms 2 and has the same size among the platforms. The memory area 36 is segmented into the number of slots. Each of the segmented storage areas of the memory area 36 is associated with any of the slots. For example, the storage area represented as the Slot #0 in the memory area 36 is associated with the platform 2-1 connected to the Slot #0. The storage area represented as the Slot #4 in the memory area 36 is associated with the platform 2-5 connected to the Slot #4. The platform 2-1 stores the transmission data in the area assigned to the slot as a transmission destination (in this case, the Slot #4) in the memory area 36.

The platform 2-1 as a transmission source serving as the root complex (RC) acquires or generates slot information indicating the slot as a transmission destination and address information indicating an address in the divided area in the memory area 36 as a transmission destination based on the storage area in the memory area 36 of the platform 2 (Step S702).

The platform 2-1 as the transmission source passes the transfer data including the slot information, the address information, and the transmission data to the PCIe bridge controller 3 having a function of a plurality of end points (Step S703). The PCIe bridge controller 3 transfers the transfer data to the platform 2-4 as a transmission destination by connecting the slot as a transmission source to the slot as a transmission destination by the EP-to-EP communication based on the slot information (Step S704). The platform 2 as a transmission destination stores the transmission data (or the transfer data) in the area indicated by the address information in the storage area corresponding to the communication buffer 221 of the platform 2 as a transmission destination based on the slot information and the address information (Step S705).

On the platform 2-5 as a transmission destination, the program reads out the transmission data stored on the communication buffer 221, and moves the transmission data to the other area in the memory (local memory) 22 or the storage 23 (Step S706, Step S707).

As described above, the data (transfer data) is transferred from the platform 2-1 as a transmission source to the platform 2-5 as a transmission destination.

(D) Advantages

In the information processing system 1 as an example of the embodiment, the PCIe bridge controller 3 mediates data transfer between the EPs in the PCIe bridge controller 3. Therefore, data transfer can be implemented between plural RCs (processors 21) connected to the PCIe bridge controller 3.

That is, each of the processors 21 independently operates as the RC of the PCIe, and the PCIe bridge controller 3 connects to the devices serving as the EPs, which are connected to the processors 21, to perform data transfer between the EPs. As a result, a problem caused by the device driver can be avoided, and high-speed data transfer can be achieved as one system.

Additionally, data transfer can be performed between different processors 21 so long as the processors 21 have a data communication function conforming to the PCIe standard. Therefore, it is possible to widen choice of the processor 21 to be used irrespective of presence of the device driver, a supported OS, and the like.

Each of the processors 21 is connected via the PCIe bridge controller 3 serving as the EP. Thus, it is not required to install the device driver for the RC ahead of the EP. Thus, the device driver is not required to be developed, and a failure is prevented from being caused by adding the device driver.

As illustrated in FIG. 1, in the conventional PCIe connection using a processor such as an Intel (registered trademark) processor, the EP is connected to the RC when the device is added to PCIe. In this case, the device driver corresponding to each EP is required to be installed, so that operation of the entire device may become unstable due to the applied device driver. There are also problems that the device is not available because a device driver is not prepared, and the processing is delayed because a CPU load factor is increased due to control of an arithmetic operation processor.

Such the problems remain even if the number of EPs is increased by using the PCIe switch controller as illustrated in FIG. 2.

As illustrated in FIG. 3, as a method of distributing a CPU load and controlling a PCIe device, it can be considered to use an interconnect that directly connects CPUs to each other. However, in order to use the CPUs in such a connection form exemplified in FIG. 3, each of the CPUs is required to be compatible with the same interconnect. Accordingly, a type of the CPU to be connected is limited, so that versatility is reduced, and options of the processor are reduced.

On the other hand, in the present information processing system 1, a general processor such as an ARM processor and an FPGA is required to operate as the RC, so that they can be easily added as the processor 21 of the present information processing system 1.

In the PCIe bridge controller 3, connection (communication) is performed by PCIe, so that it is possible to achieve high-speed transfer that cannot be achieved by Ethernet. Additionally, it is possible to perform transmission and reception of a high-definition image such as 4K and 8K between platforms, parallel computation of large-scale big data, and the like.

A dedicated processor specialized in each function such as image processing, data retrieval, and the like can also be connected, so that a function can be added, and performance can be improved at low cost.

Additionally, in the present information processing system 1, the system is not required to be virtualized, for example, and system performance is not deteriorated due to virtualization of the system. Thus, the present information processing system 1 can also be applied to a system used for a high-load arithmetic operation such as AI inference or image processing.

(E) Others

The present disclosure is not limited to the embodiment described above, and can be variously modified to be implemented without departing from the gist of the embodiment. The configurations and pieces of processing in the embodiment can be selected as needed, or may be appropriately combined with each other.

For example, in the configuration illustrated in FIG. 6, the PCIe bridge controller 3 includes the eight slots 34-1 to 34-8, but the embodiment is not limited thereto, and can be variously modified to be implemented. That is, the PCIe bridge controller 3 may include seven or less slots 34, or nine or more slots 34.

In the embodiment described above, although the communication system using PCIe has been described, the embodiment is not limited thereto. The embodiment may be applied to communication based on a communication standard other than the PCIe.

In the embodiment described above, although PCIe is exemplified as the standard of an I/O interface for each component, the interface is not limited to the PCIe. For example, the interface for each component may be achieved by a technique for performing data transfer between a device (peripheral control controller) and a processor via a data transfer bus. The data transfer bus may be a general-purpose bus that can transfer data at high speed in a local environment (for example, one system or one device) provided in a single housing. The interface may be either one of a parallel interface and a serial interface.

In a case of serial transfer, the I/O interface may have a configuration that is capable of performing point-to-point connection and transferring data on a packet basis. In a case of serial transfer, the I/O interface may include a plurality of lanes. A layer structure of the I/O interface may include a transaction layer for generating and decoding a packet, a data link layer for performing error detection and the like, and a physical layer for conversion between serial and parallel. The I/O interface may also include a root complex at the top of the hierarchy including one or a plurality of ports, an end point as an I/O device, a switch for increasing the port, a bridge for converting a protocol, and the like. The interface may transmit transmission data and a clock signal after multiplexing them through a multiplexer. In this case, a reception side may separate the data from the clock signal through a demultiplexer.

According to the disclosure described above, the present embodiment can be implemented and manufactured by those skilled in the art.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing system comprising:
   platforms, each serving as a computer that executes arithmetic processing; and
   a relay device that is connected to the platforms and that communicates with each of the platforms to relay communication between the platforms over a Peripheral Component Interconnect Express (PCIe) bus, wherein
   the relay device includes
      a first end point that receives data from a root complex of a first platform among the platforms, and
      a second end point that transfers the data to a root complex of a second platform among the platforms, wherein the data to be transferred is received at the second end point by tunneling from the first end point,
   each of the platforms includes a physical memory including memory areas each associated with the respective end points,
   a platform that is a transmission source of transmission data among the platforms stores the transmission data in a memory area associated with an end point of a transmission destination among the memory areas of the physical memory of itself, and
   when receiving transmission data from the first platform that is a transmission source serving as a root complex via the first end point connected to the first platform, the relay device transmits the received transmission data to the second platform that is a transmission destination serving as a root complex via the second end point that is a transmission destination associated with a memory area in which the received transmission data has been stored.

* * * * *